Aug. 29, 1950      A. G. SHERMAN      2,520,816
COOKING STOVE
Original Filed Aug. 11, 1947      3 Sheets—Sheet 1
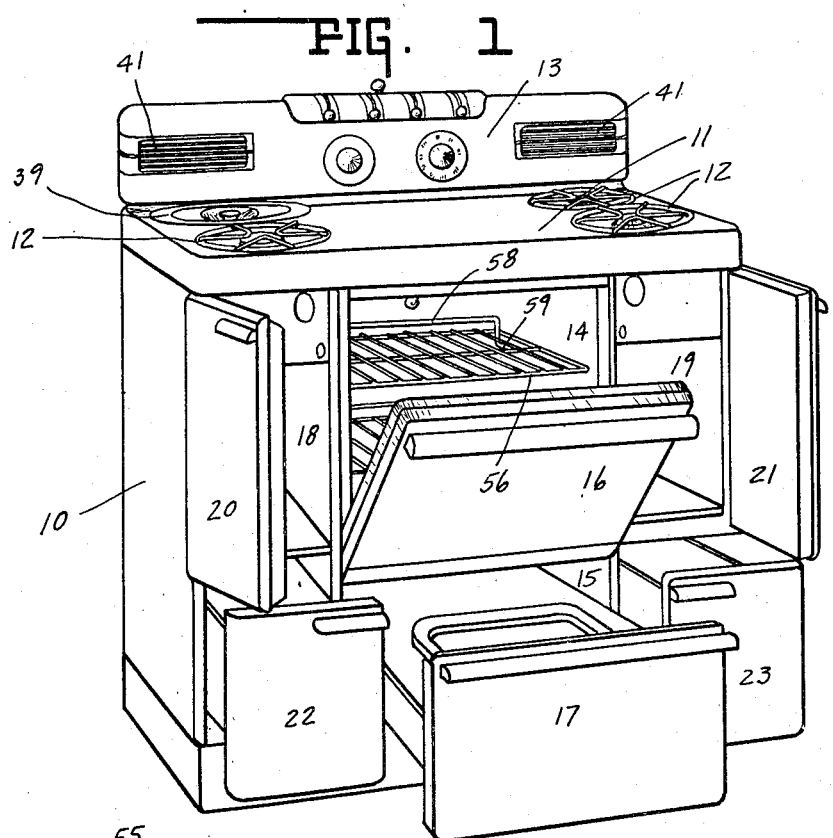
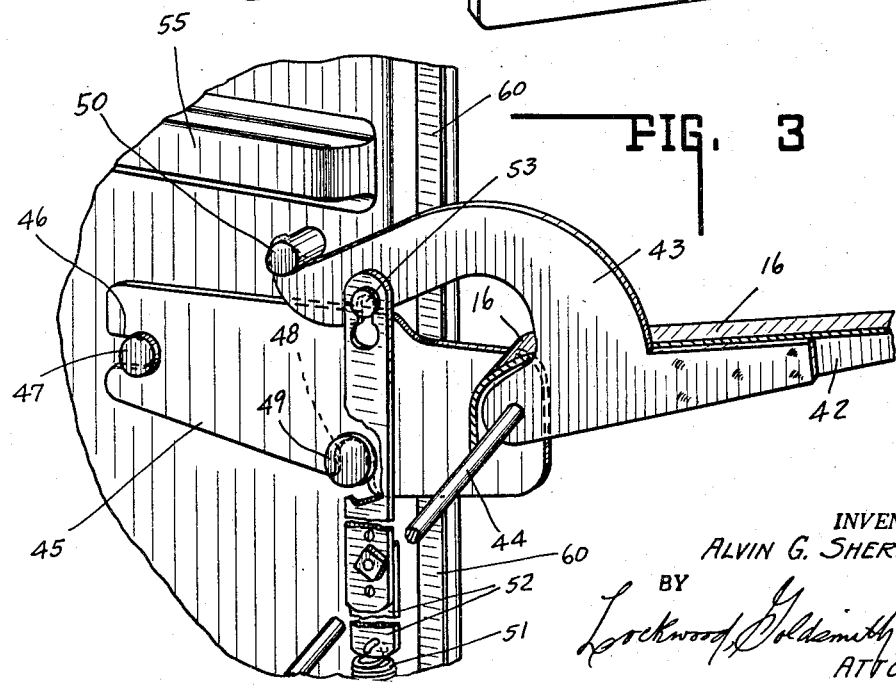
INVENTOR.
ALVIN G. SHERMAN.
BY
Lockwood, Goldsmith & Galt,
ATTORNEYS.

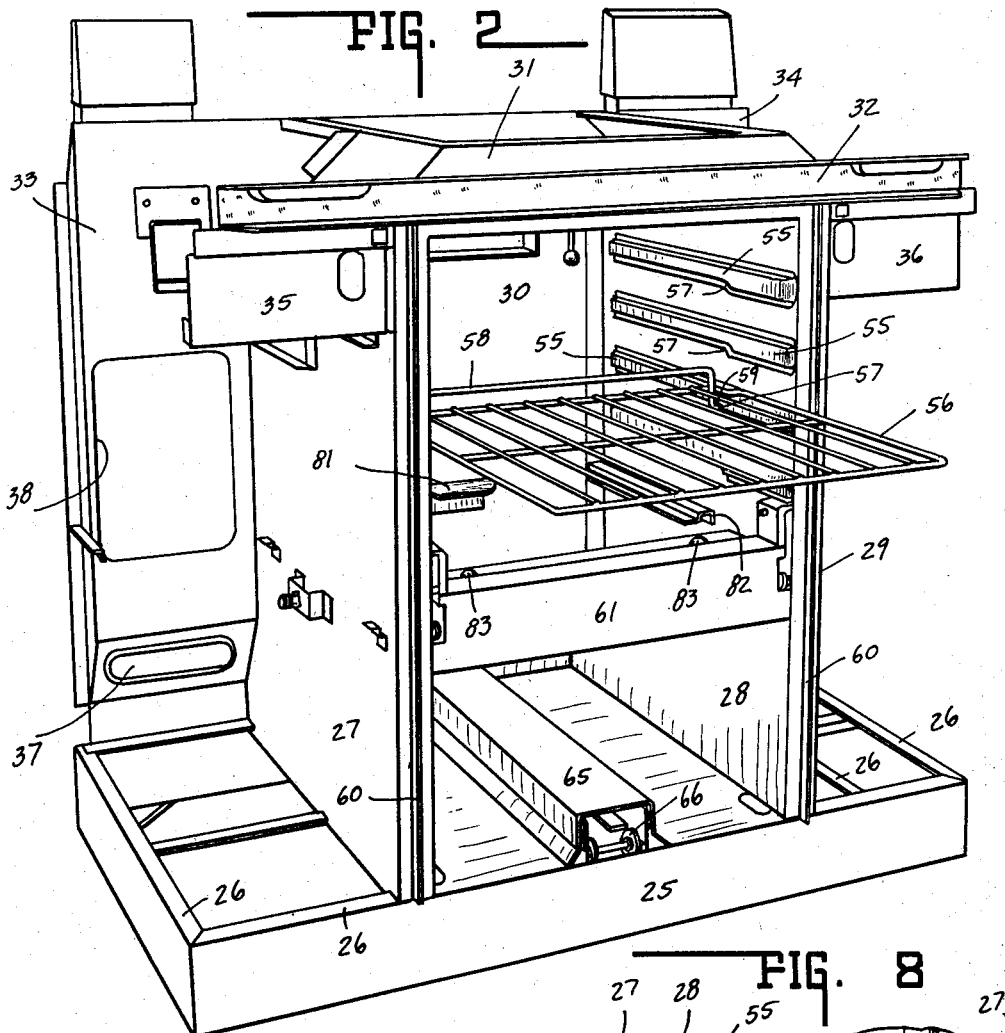
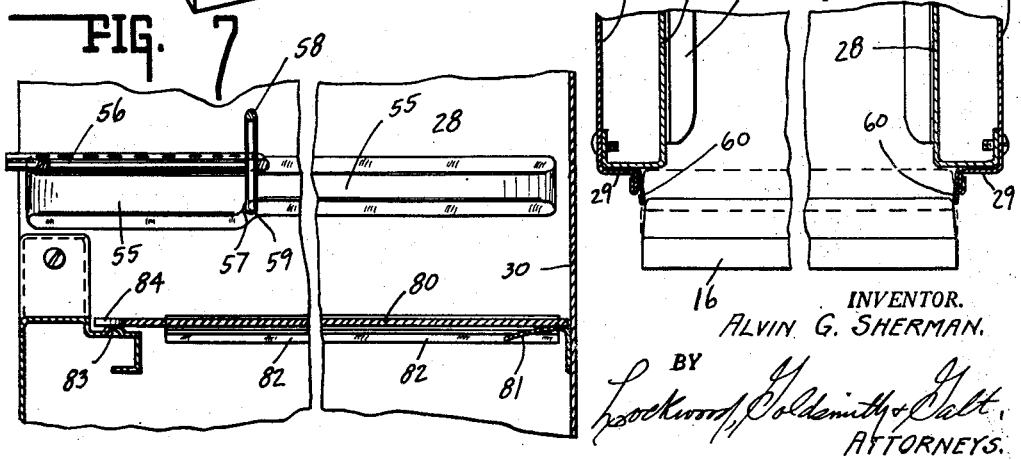

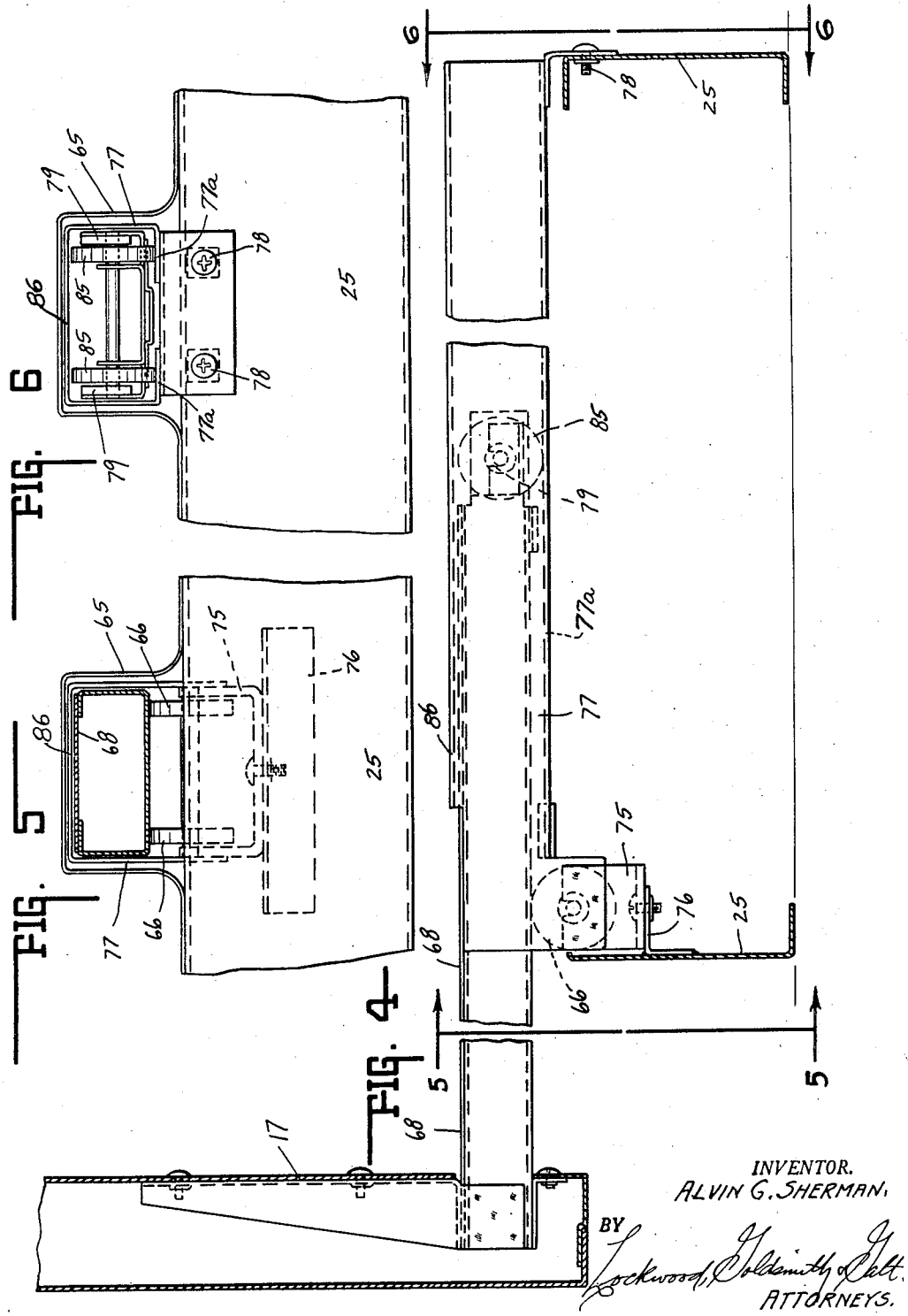

UNITED STATES PATENT OFFICE 2,520,816

COOKING STOVE

Alvin G. Sherman, Grosse Pointe Park, Mich., assignor to Globe American Corporation, Kokomo, Ind., a corporation Original application August 11, 1947, Serial No. 767,971. Divided and this application July 30, 1948, Serial No. 41,530

1 Claim. (Cl. 126—41)

This invention relates to a cooking stove or range, and particularly to the structural elements embodied therein, reference being had to my application for Letters Patent, Serial No. 767,971, filed August 11, 1947, now abandoned, for Cooking Stove, of which this is a divisional application.

This invention relates to a stove having a central structural unit providing a supporting frame which greatly simplifies and facilitates production, and accordingly effects economies reflected in the cost of producing ranges of this character. This is accomplished by providing a central box-like structure embracing the heating compartments, such as the oven and broiler. The usual warming and utensil compartments may then be arranged on each side thereof with the table-like working top, including the usual burners, being supported centrally upon such said unit. This arrangement thereby in effect comprises a central supporting unit including the oven and broiler.

A further feature of the invention resides in the elongated housing carried by the central supporting unit at the bottom of the broiler compartment for housing and protecting the supporting rollers for the broiler shelf from the heat zone.

Another feature of the invention resides in the mounting of the forward rollers positioned to carry the broiler slide, the channel track therefor, and the rear thrust rollers carried by the slide supported on the channel track having their upward thrust against the elongated housing.

The full nature of the invention will be understood from the accompanying drawings and the following description and claim.

Fig. 1 is a perspective view of the stove, showing its several compartments partially open.

Fig. 2 is a perspective view of the central supporting unit housing the oven and broiler.

Fig. 3 is a perspective view of the oven door hinge construction.

Fig. 4 is a side elevational view of the broiler slide construction with parts broken away and shown in section.

Fig. 5 is a view taken on the line 5—5 of Fig. 4 and in the direction of the arrows, with rearward parts removed for clarity.

Fig. 6 is a view taken on the line 6—6 of Fig. 4 and in the direction of the arrows.

Fig. 7 is a vertical sectional view of a portion of the oven, with parts shown in section and other parts in elevation.

Fig. 8 is a horizontal sectional view through a portion of the oven showing the oven sealing strip assembly.

In the drawings there is shown a gas range having side walls 10, a cooking top 11 with the cooking well and top burners 12 mounted thereon, and an upwardly extending backguard 13 mounted at the back of the cooking top. The cooking top is supported by a central supporting unit including the oven compartment 14 and broiler compartment 15. The oven compartment is closed by the usual oven door 16 and the broiler compartment by the broiler door 17. The central supporting unit is adapted to support at opposite sides thereof the warming and storage spaces 18 and 19 having vertically hinged doors 20 and 21, respectively. Below said spaces there are provided the sliding drawers 22 and 23 for cooking utensils.

The central supporting unit, as shown in Fig. 2, comprises a rectangular base frame member 25 coextensive with the cooking top of the stove and flanged along its bottom and top edges, as indicated at 26, to reinforce said frame and provide a support for a central superstructure. Centrally of the base frame and secured thereupon there is a cabinet-like structure housing the oven and broiler compartments 14 and 15 and formed of sheet metal side walls, each comprising an outer panel 27 and an inner panel 28, said panels being spaced for embracing a suitable insulating material, such as rock wool or the like. One of said panels is provided along its forward edge with an abutting flange 29. Joined to the panels 27, 28 at the rear thereof, there is a similarly formed rear wall 30. Over the top of the unit and supported by said walls there is a sheet metal dome 31 adapted to be packed with insulating material over which the cooking top 11 may be mounted so that the central portion thereof, comprising the working table of the stove, is insulated from the oven heat.

Supported by the panels 27, 28 forwardly of the dome 31 there is a mounting rail 32 having its ends overhanging the central unit for receiving and supporting the cooking top and coextensive therewith. The front panel of the rear wall 30 is similarly extended beyond the side walls to provide back panels 33 and 34 which are also coextensive with the cooking top and the overhanging portions of the mounting rail 32, the upper central portion of the rear wall front panel comprising a part of the dome 31. Supported by and depending from the overhanging portions of the mounting rail 32 there are end brackets 35, 36.

The above described structure provides a central supporting unit for all other parts of the stove, such as to permit them to be readily mounted and assembled thereon. Thus, the side walls 10 of the stove are mounted upon the respective back panel extensions 33, 34, the flanges 26 of the base frame 25, and the end brackets 35, 36, whereas the cooking top is supported by the back panels 33, 34 and the mounting rail 32 to extend over the dome 31.

The back panels 33, 34 extending beyond each of the side panels 27, 29 of the central structure, are formed to provide a flue, panel 33 being apertured at 37 adjacent its lower end in communication with the compartment housing the utility drawer 22, and at 38 in communication with the compartment 18 into which the cooking well 39 extends. Similarly, the lower end of the flue formed from the back panel 34 is similarly apertured, the upper ends of each of the flues terminating with the louvres 41 of the backguard 13.

The oven door 16 is formed of spaced sheet metal panels 16a and 16b between which suitable insulating material is packed, the inner panel 16a thereof having secured thereto along each side tapered angle bars 42, the lower ends of which are rigidly secured by spot welding or the like to the supporting hooks 43. A hinge rod 44 extends through the side flanges of the door panels and hooks, having pivotally mounted adjacent each end thereof the hinge members 45. The forward end of each of the hinge members is bifurcated at 46 to engage and be slidably interlocked with a stud 47 extending inwardly from each of the oven walls, respectively. The lower edge of each of said hinge members is provided with a locking recess 48 adapted to seat and be removably interlocked with a stud 49 also extending inwardly from each of the oven walls, respectively. Each of the supporting hooks 43 is crooked at its inner exposed end to engage the respective inwardly extending studs 50 when the oven door is hingedly mounted and opened to its substantially horizontal lowered position.

This arrangement of the hinge mounting for the oven door facilitates removal thereof in that by swinging it slightly upwardly from its lowered position to disengage the hooks 43 from their studs 50, and then raising the inner edge of the door to disengage the hinge member from the stud 49, the door may be pulled directly outwardly to dismounted position. However, when it is in mounted position, the bifurcated ends of the hinge members are interlocked with the studs 47 and their locking recesses with studs 49, thereby preventing any disconnecting outward movement. The door is then free to swing about the hinge rod 44 to opened or closed position, and when lowered to opened position, substantially horizontally, the hooked ends of the hooks 43 engage with the studs 50 to support the door in such lowered position through the angle bars 42.

The oven door is counterbalanced when moved to and from open position by a counterbalance tension spring 51. The upper end of said spring is connected to an adjustable strap 52 which in turn is removably connected with a pin 53 on the hinge member 43. The lower end of the spring is connected with the wall of the oven substantially below the hinge mounting of the door.

In the usual manner, the inner side walls of the oven are provided with a series of oven rack runners 55 extending horizontally at different elevations. The said runners are arranged to slidably support thereon a grilled wire oven rack 56. Adjacent the forward end of each of the runners there is an enlarged portion such as to form a downwardly extending forwardly sloping shoulder 57. The shoulders of the respective runners provide a stop for limiting the outward sliding movement of the rack 56. For this purpose the end bars of the rack are adapted to rest and slide upon the upper surface of the runners but at the rear edge of the rack there is a guard rail 58 having downwardly extending end legs curved laterally at 59 to ride along the under side of said runners into stopping engagement with the shoulders 57. In line with the inturned legs 59 the end supporting wire of the rack is bent inwardly to form notched rear corners. This permits the forward portion of the rack to be tilted upwardly when it is stopped by the shoulders 57 so as to lower the legs 59 to free them therefrom. In such tilted position the rack may then be drawn outwardly free of the runners for complete disengagement and replacement on the same or other runners of the desired elevation.

For sealing the oven door 16, as well as the broiler door 17, when closed, a one piece door sealing strip 60 is provided independently of the oven structure in U-shaped form for mounting along the front edges of the panels 27, 28 and the mounting rail 32. Said strip is in the form of an angle bar with its outer flange lying snugly against the flange 29 of panel 27 when in place, and its inner flange extending between the telescoping edges of said panels 27, 28. The upper portion of the strip 60 is similarly inserted between the forward edge of the oven top plate and the mounting rail 32 so that the outer flange of the strip snugly fits along the under surface of the lower flange of said rail. As a one piece strip it is readily inserted into place to provide both a finish for the respective compartments and a seal for their doors. In conjunction therewith there is a cross bar 61 formed of sheet metal and channel shaped in cross section, having upwardly bent and cut away portions to house and enclose the exposed parts of the hinge members 45 and supporting hooks 43. The flanges of the cross bar extend inwardly with the body thereof forming a smooth surfaced sealing face against which the bottom edge of the oven door 16 engages and seals, as well as the upper edge of the broiler door 17.

The bottom floor plate of the broiler compartment is formed with an inverted trough 65 for housing and protecting from the heat zone, the rollers 66 upon which a broiler slide 68 is supported. The broiler slide 68 is supported for longitudinal movement within the protecting trough 65 upon a roller mechanism wherein said slide bears upon the rollers 66 which are rotatably mounted in bearing slots formed in the two upwardly extending ears of the U-shaped support 75 carried by the angle bracket 76 secured to the inner wall of the base 25. Welded or otherwise secured to the bracket 75 there is a rearwardly extending channel track section 77 which at its inner end is secured as at 78 to the opposed inner wall of the base 25. Rotatably mounted in the bearing slots 79 formed adjacent the rear or inner end of the slide 68 is a pair of rollers 85 to receive the end thrust of said slide and which are adapted to ride upon the lower track portion 77a formed by the track section 77 longitudinally thereof. When the broiler slide is fully extended, it is supported at the bottom upon the forward roller 66, while the rear rollers 85 ride upon and bear against the upper track portion 86 of the track 77, thereby supporting the load upon the outwardly extending portion of the slide.

The bottom plate 80 of the oven has a three point suspension, one centrally of its rear edge and two at its forward corners. This is important in that the plate is stabilized when in mounted position without the necessity of providing accurately positioned supports. On the back wall of the oven, secured thereto to extend inwardly therefrom, there is a downwardly sloping bracket 81. Secured to each of the side panels 28 there is a guide rail 82. The guide rails each extend in a plane slightly lower than the rear portion of the bracket 81 so that they will guide the rear edge of the plate 80 onto the lower front edge of the said bracket, after which further sliding movement of the plate causes its rear edge to slide upwardly on the bracket free of the guide rails. While the guide rails act to guide the plate in the sliding movement onto the bracket 81, when it is in place its rear edge is supported centrally only upon the bracket, free of the guide rails. Thereupon its forward edge rests upon and is supported by the two spaced buttons 83 to provide a three point suspension. In such position, its forward edge is flush with the upper flanged surface of the cross bar 61 and is provided with a notched portion 84 for the usual burner lighting purposes.

The invention claimed is:

In a cooking stove having a broiler compartment, bottom and end plates for said compartment, an inverted trough-like hood formed from said bottom plate to extend upwardly from the central portion thereof, a broiler slide carrying a closure for said compartment at the forward end thereof conforming in cross sectional contour with said hood to slidably telescope therein for movement longitudinally thereof between open and closed positions, supporting brackets secured to the front and rear end plates, an inverted trough-like channel track having lower and upper rail portions extending through and nesting in said hood supported at its opposite ends by said brackets, a pair of supporting rollers rotatably mounted on the forward bracket for receiving and supporting said slide upon the lower rail portion of said track, and a pair of rollers mounted at the rear of said hood adapted to roll on the lower rail portion of said track upon said slide being moved toward its closed position and upon the upper rail portion thereof when moved toward its open position.

ALVIN G. SHERMAN.

REFERENCES CITED

The following references are of record in the file of this patent:

UNITED STATES PATENTS

| Number | Name | Date |
|---|---|---|
| 769,024 | Ryan | Aug. 30, 1904 |
| 1,614,167 | Wilkinson | Jan. 11, 1927 |
| 2,028,636 | Wilkinson | Jan. 21, 1936 |
| 2,142,898 | Harmon | Jan. 3, 1939 |
| 2,155,654 | Haley | Apr. 25, 1939 |